United States Patent [19]
Leung

[11] Patent Number: 5,535,074
[45] Date of Patent: Jul. 9, 1996

[54] DISK DRIVE APPARATUS HAVING UP AND DOWN HEAD SUPSENSIONS INDEPENDENTLY LOADABLE INTO A SPACE BETWEEN IMMEDIATELY ADJACENT DISKS

[75] Inventor: Chak M. Leung, Palo Alto, Calif.

[73] Assignee: Read-Rite Corporation, Milpitas, Calif.

[21] Appl. No.: 370,479

[22] Filed: Jan. 9, 1995

Related U.S. Application Data

[63] Continuation of Ser. No. 43,640, Apr. 5, 1993, abandoned, which is a continuation-in-part of Ser. No. 878,225, May 4, 1992, abandoned.

[51] Int. Cl.$^6$ ............................. G11B 5/48; G11B 5/54; G11B 5/55
[52] U.S. Cl. ................. 360/104; 360/105; 360/106
[58] Field of Search ........................ 360/104, 105, 360/106, 98.01, 109

[56] References Cited

U.S. PATENT DOCUMENTS

| | | | |
|---|---|---|---|
| 4,075,517 | 2/1978 | Adler | 360/106 |
| 4,544,972 | 10/1985 | Kogure et al. | 360/106 |
| 4,703,376 | 10/1987 | Edwards et al. | 360/105 |
| 4,819,094 | 4/1989 | Oberg | 360/104 |
| 4,829,396 | 5/1989 | Okutsu | 360/105 |
| 4,884,261 | 11/1989 | Dalziel | 360/105 |
| 4,933,785 | 6/1990 | Morehouse et al. | 360/105 |
| 5,023,737 | 6/1991 | Yaeger | 360/105 |
| 5,060,099 | 10/1991 | Yaeger et al. | 360/105 |
| 5,070,423 | 12/1991 | Gloski | 360/106 |
| 5,079,652 | 1/1992 | Ishida et al. | 360/105 |
| 5,134,532 | 7/1992 | Svendsen et al. | 360/106 |
| 5,189,578 | 2/1993 | Mori et al. | 360/106 |
| 5,223,993 | 6/1993 | Squires et al. | 360/98.01 |

FOREIGN PATENT DOCUMENTS

| | | | |
|---|---|---|---|
| 56-19561 | 2/1981 | Japan | 360/106 |
| 02-227886 | 9/1990 | Japan | 360/109 |

OTHER PUBLICATIONS

"Balanced Force Voice–Coil Actuator", Frater, N. K. IBM Technical Disclosure Bulletin, vol. 15, No. 3, p. 749, Aug. '72.

"Flying Height Control in Disk File", IBM Technical Disclosure Bulletin, vol. 30, No. 7, pp. 409–410, Dec. '87.

*Primary Examiner*—Stuart S. Levy
*Assistant Examiner*—Craig A. Renner
*Attorney, Agent, or Firm*—Nathan N. Kallman

[57] ABSTRACT

The headstack of a disk drive is formed with separate sections, each of which supports a plurality of head suspensions. In one embodiment, the sections are blocks on which pairs of head suspensions having UP and DOWN facing sliders are mounted. The blocks are individually positioned and aligned relative to a disk stack. In a second embodiment, head suspensions are supported by a pair of modules. A first module supports suspensions with UP head sliders and a second module supports suspensions with DOWN head sliders. The modules interlock so that an alternating arrangement of UP and DOWN heads result. By use of a comb-like head loading tool, the suspensions that carry the head sliders are spaced and loaded to respective disk surfaces.

11 Claims, 10 Drawing Sheets

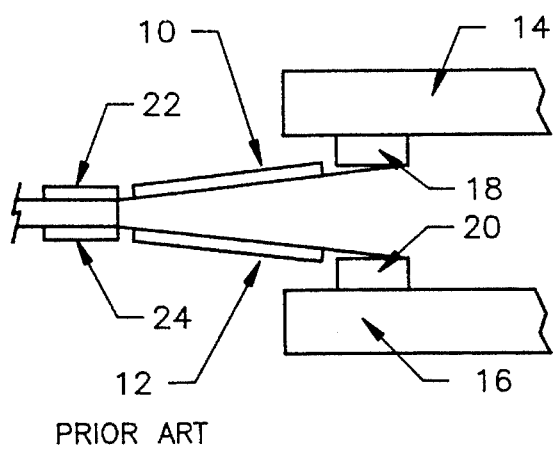
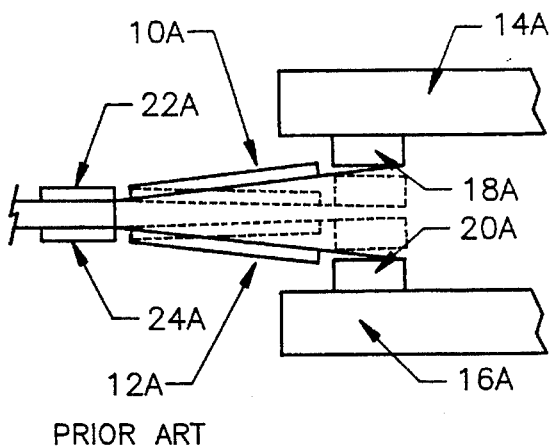
Fig 1A — PRIOR ART
Fig 1B — PRIOR ART
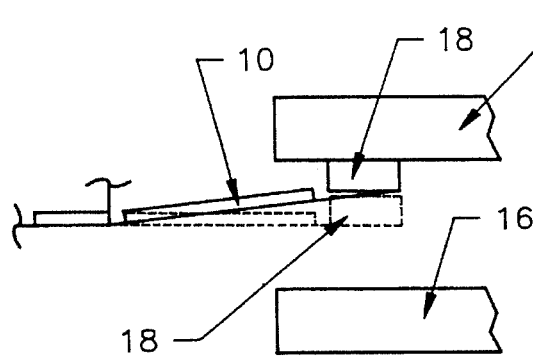
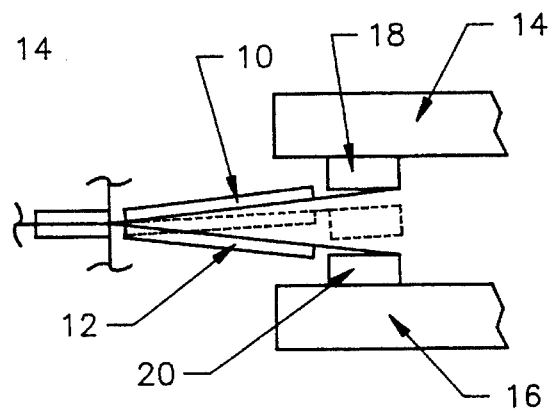
Fig 2A
Fig 2B
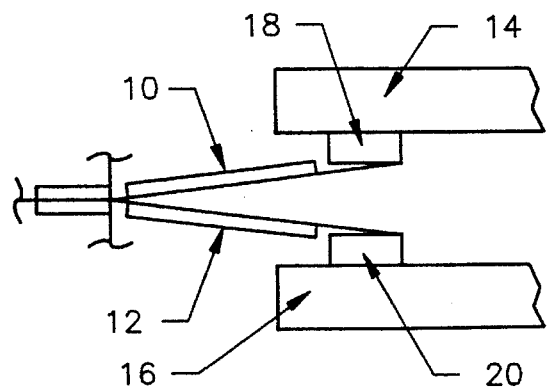
Fig 3

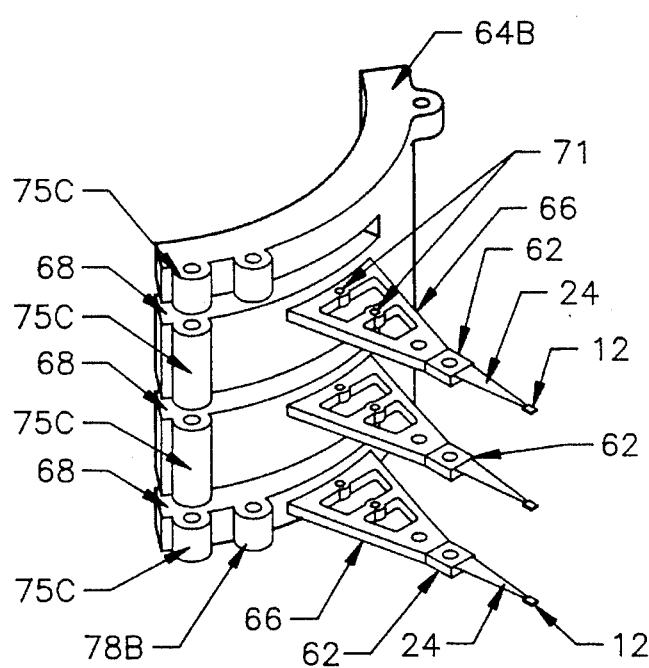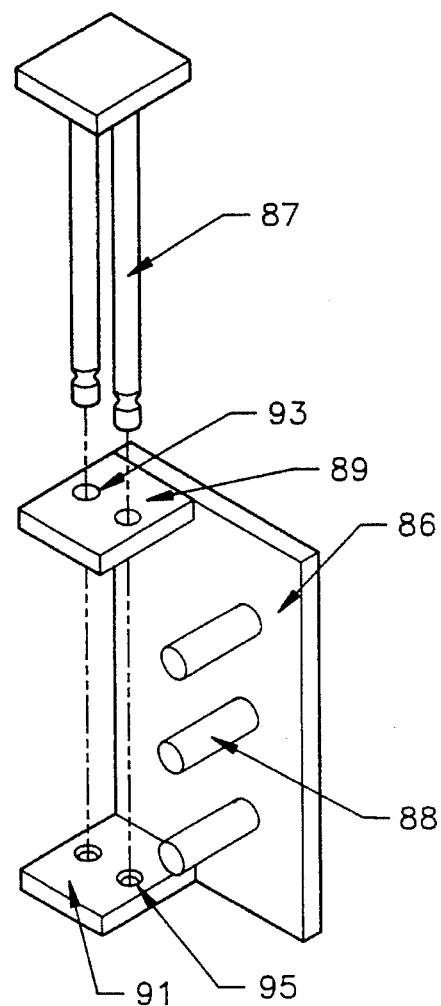
Fig 8A
Fig 8B
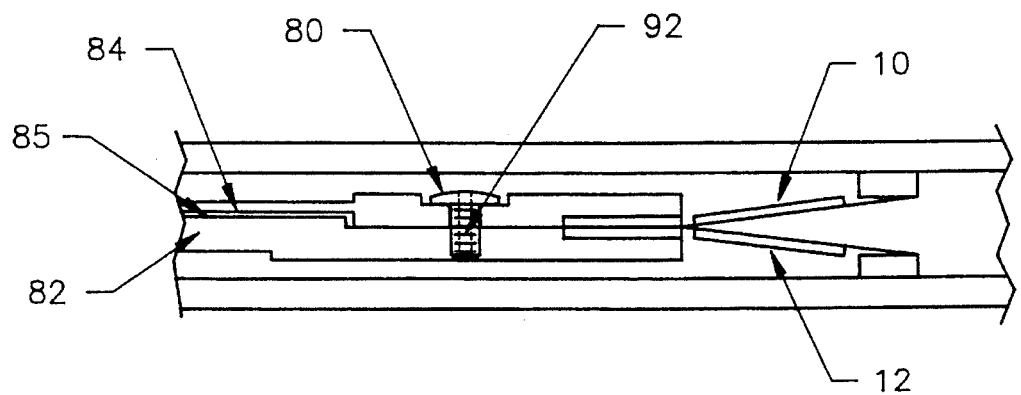
Fig 9

DISK DRIVE APPARATUS HAVING UP AND DOWN HEAD SUPSENSIONS INDEPENDENTLY LOADABLE INTO A SPACE BETWEEN IMMEDIATELY ADJACENT DISKS

This application is a continuation of application Ser. No. 08/043,640, filed Apr. 5, 1993, now abandoned, which is a continuation-in-part of application Ser. No. 07/878,225, filed May 4, 1992, now abandoned.

FIELD OF THE INVENTION

This invention relates to a novel assembly of magnetic head suspensions used in disk drives and in particular to a method and means of reducing the disk-to-disk spacing (Z height) in a headstack of a disk drive.

DESCRIPTION OF THE PRIOR ART

Presently known disk drives include a plurality of magnetic disks and a stack of head arm assemblies located adjacent to the disks for recording and reading data registered on concentric tracks of the disks. The tracks of the disks define cylinders that are accessed bidirectionally in response to commands. The head arm assemblies, which include head suspensions that support sliders with transducers, are connected to a common structure which is actuated by a head actuator, such as a voice coil motor. The heads must be precisely aligned relative to each other and to the axis of the motor spindle that rotates the disks.

In prior art disk drives, the head arms with suspensions are mounted individually to a comb-like structure (E block) which is linked to the head actuator. The individual suspensions are glued or ball staked (swaged) and are formed to provide a desired spring force and gram load that acts in opposition to the aerodynamic lift force applied to the slider during rotation of the disks. The swaging is effectuated in one direction for the head sliders that, for example, face upward (UP heads) and in the opposite direction for the head sliders that face downward (DOWN heads). This procedure can introduce gram load variations when assembling the suspensions to the supporting comb-like structure.

Another problem that arises when using an integral structure for mounting the head arms is that if rework of a defective head is required, the whole headstack needs to be disassembled from the actuator, which is time-consuming and costly.

SUMMARY OF THE INVENTION

An object of this invention is to minimize head load space needed for each head suspension of a headstack in a disk drive.

Another object of this invention is to provide a disk drive wherein the cost of assembly and rework of headstacks are effectively reduced.

Another object is to enable all suspensions of a headstack, including UP and DOWN heads, to be swaged in the same direction thereby enhancing gram load consistency.

According to this invention, a disk drive incorporates separate support structures that are provided for supporting head suspensions on which head sliders and transducers are seated. The support structures with suspensions are individually positioned and aligned sequentially relative to a head actuator. In one embodiment of the invention, the support structures are blocks, wherein each block supports an UP head and a DOWN head. During assembly the blocks are consecutively positioned in a headstack arrangement and each block is rotated, aligned and then fixed in place. The blocks are aligned with reference to the base of the head actuator.

In an alternative embodiment, a headstack is formed with a plurality of modules or sections, preferably two complementary sections. One section supports a number of UP heads and a second section supports a number of DOWN heads. The head suspensions are joined to mounting elements that are preferably formed with the walls of the modules. The two modules are interlocked to form a cylindrical body that is coupled to a rotary actuator. The modules with the head suspensions are positioned in proper alignment relative to the disk stack.

DESCRIPTION OF THE DRAWINGS

The invention will be described with reference to the drawings in which:

FIG. 1A is a representational side view of a prior art head/disk assembly (HDA), shown in part, having an UP head and DOWN head disposed between two magnetic disks;

FIG. 1B is a representational side view of the HDA of FIG. 1, illustrating the UP and DOWN heads loaded to respective disks;

FIG. 2A shows an UP head only being loaded to an upper disk;

FIG. 2B shows a DOWN head only being separately loaded to a lower disk after the loading of the UP head;

FIG. 3 shows both an UP head and a DOWN head loaded to respective disks;

FIG. 8A is an isometric rear view of a portion of the outer module used for supporting head suspensions;

FIG. 8B depicts a tool used for positioning the head suspensions of the modules in proper alignment;

FIG. 9 is a sectional side view, partly broken away, illustrating a modification of the novel assembly;

DETAILED DESCRIPTION OF THE INVENTION

Figure 4A:
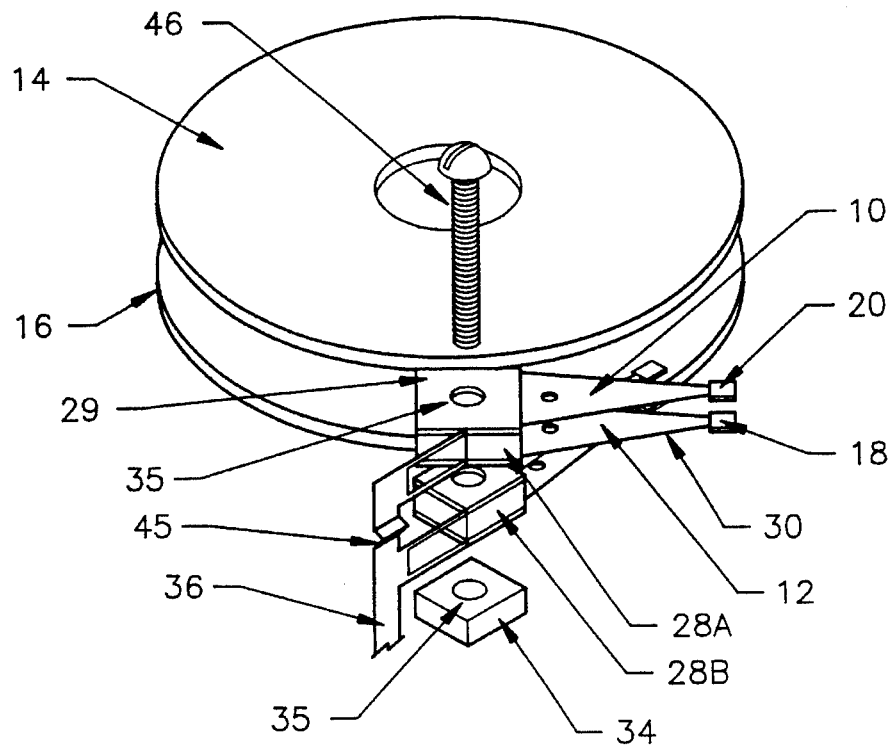
FIG. 4A is an isometric view illustrating a headstack design using support blocks for loading UP and DOWN heads, in accordance with this invention.

With reference to FIGS. 1A and 1B, a prior art disk drive includes head suspensions 10, 10A and 12, 12A which are disposed in the loading space between two adjacent disks 14, 14A and 16, 16A, respectively. Each suspension 10, 10A and 12, 12A supports respectively an UP head slider 18, 18A and a DOWN head slider 20, 20A. The suspensions 10 and 12 are attached respectively to suspension baseplates 22, 22A and 24, 24A. The disks 14 and 16 are seated on a motor spindle 26 (see FIG. 5) for rotation at a given speed.

The total disk-to-disk pitch comprises the disk thickness, the thickness of head sliders 18 and 20, suspensions 10 and 12 and the head loading spaces between the suspensions. A typical nanoslider (a 50% slider which has dimensions about 50% of a standard slider) that is mounted on a suspension, for example, has an approximate height of 0.017 inch and measures 0.006 inch for the loaded suspension and 0.0125 inch for the head loading space for each suspension. The typical disk thickness is about 0.025 inch. In such case, the total disk-to-disk pitch is about 0.096 inch and the total head loading space for the two suspensions are 0.025 inch, which is approximately 26% of the total pitch.

FIG. 2A illustrates the procedure for loading the heads to a headstack assembly, in accordance with this invention. The UP head 18 is shown being loaded into the space between the two disks 14 and 16. In FIG. 2A, the head slider 18 is shown in a loaded position, and as illustrated by the dashed lines in a combed back or unloaded position. In FIG. 2B, the sliders 18 and 20 both are shown in a loaded position in the space between the disks 14 and 16. The head loading space is optimized by first positioning the UP head 18 in a loaded or partially loaded position very close to the surface of disk 14 with the load beam of suspension 10 pointing away from the plane of the disk 16 to which DOWN slider head 20 of suspension 12 is to be loaded. When the DOWN head is being loaded, the load beam is combed back so that its suspension 12 is moved away from the surface of disk 16 in a similar orientation as the load beam of UP head suspension 10. In this way, the head loading space ordinarily required in a conventional prior art headstack design is significantly reduced. The DOWN head slider 20 is gently loaded onto disk 16 and is positioned very close to the disk 16 or in contact with the disk.

FIG. 3 illustrates the arrangement of both head sliders 18 and 20 within the same disk-to-disk space. The head loading space needed for suspensions 10 and 12 has been greatly reduced, thereby allowing the disk-to-disk pitch to decrease substantially. As a result, more vertical space becomes available for additional heads and disks within a given limited physical space so that total data storage capacity is effectively increased using the same disk drive format.

Figure 4B:
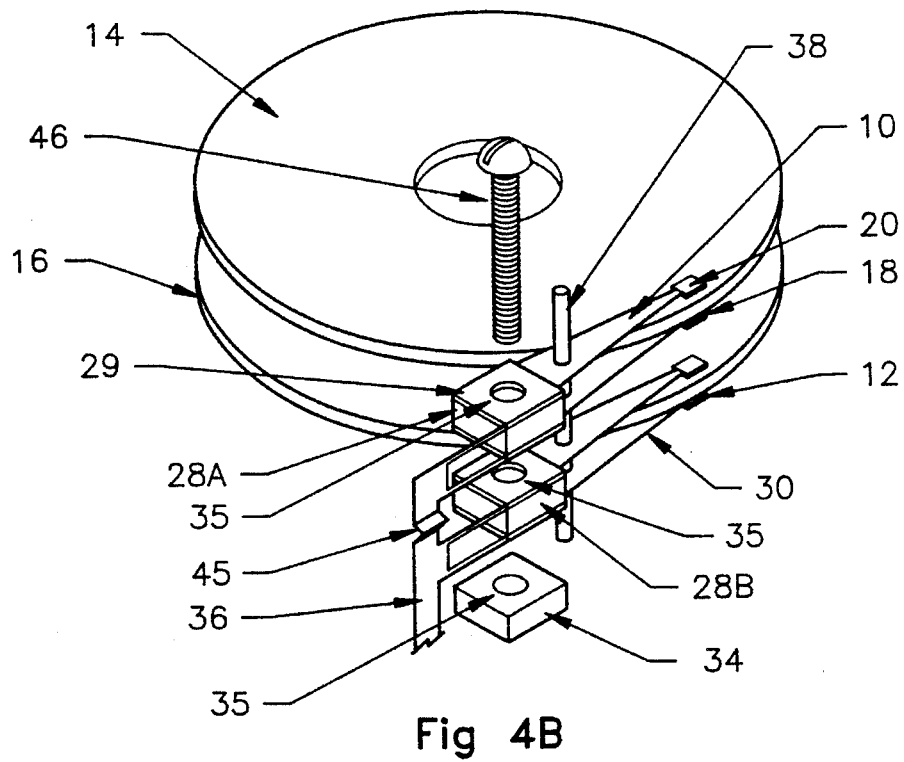
FIG. 4B is an isometric view illustrating the headstack design with the heads rotated and loaded to the disks.
Figure 12:
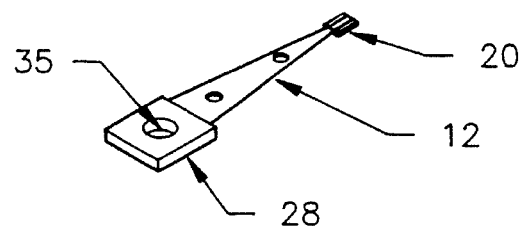
FIG. 12 is an isometric view of a typical head suspension, such as used with this invention.

FIGS. 4A and 4B show a head/disk assembly (HDA) including a pair of apertured blocks 28A and 28B. The block 28A supports head suspensions 10 and 12 having an UP head 18 and a DOWN head 20 respectively. The support block 28B also supports similar head suspensions having an UP head and DOWN head. As shown in FIG. 12 the suspension 12 is joined to a suspension baseplate 29 which has a central aperture 35. Apertured baseplates 29 are similarly joined to suspensions 10.

As shown in FIG. 4B, the blocks 28A and 28B form a comb-like structure or E block having spaced slots within which the head suspensions are located. The blocks 28 are positioned and the head arms are aligned, using a mechanical pin 38 as shown in FIG. 4B. A flexible circuit cable 36, partially shown, is connected to the head assemblies and to read/write circuitry. The flexible cable 36 is formed with bends 45 to avoid mechanical interference with adjacent blocks and to accommodate the flexible cables. The flexible cable 36 provides rotational and translational flexibility of the blocks 28A, 28B to enable the head loading process to be implemented. The headstack 30 pivots on a rotatable actuator baseplate 34, which is joined to the blocks 28A and 28B. The actuator baseplate 34 and blocks 28A and 28B have apertures 35 that are aligned by means of a screw 46 that passes through the apertures and threads to the actuator baseplate 34. The screw 46 may be replaced by a bearing assembly which also screws on to baseplate 34 through the apertures 35 of blocks 28A and 28B. In this case, the bearing assembly rotates relative to the fixed baseplate 34.

To assemble the headstack 30, the heads 18 and 20 of suspensions 10 and 12 associated with the block 28B are first loaded onto the bottom disk 16, while the other block 28A, including suspensions and head sliders, is rotated sideways and away from the disk pack. Next the upper block 28A is rotated into place and the associated heads 18 and 20 of suspensions 10 and 12 are loaded. All of the heads are then aligned by the pin 38. If more than two disks are used in the disk stack of the drive, the sequence is repeated until all the blocks are loaded so that the centers of the blocks are closely aligned with the central planes of the disks. The loading spaces between the disks accommodate the head sliders and suspensions. The screw (or bearing assembly) 46 is then inserted through the center holes 35 of the blocks 28A, 28B and threaded onto the actuator baseplate 34, thereby securing all of the blocks. When the blocks 28A, 28B are assembled and sufficiently secured to the headstack, the support block 28A, which supports the suspensions 10 and 12 with the heads 18 and 20, is moved to its final position and orientation and assembled to the disk drive. The head sliders are loaded to rest respectively on the disks 14 and 16 for static head loading or onto a rotating disk pack in the case of dynamic loading. The mechanical alignment pin 38 used for holding the blocks 28A, 28B in place is then removed. FIG. 4B shows the blocks 28 and attached head suspensions rotated towards the disk surfaces.

The E block comprising the blocks 28A, 28B is thus assembled with the actuator baseplate 34 and with a spacing material, such as aluminum or a magnesium alloy, (not shown) that separates the UP head and DOWN head on the same block. A voice coil assembly 96 (see FIG. 10) is attached to block 28B to enable rotation of the entire actuator for track seeking. The headstack 30 of FIG. 4B is particularly useful for small disk drives, such as 1.3 inch disk drives or smaller.

Figure 5:
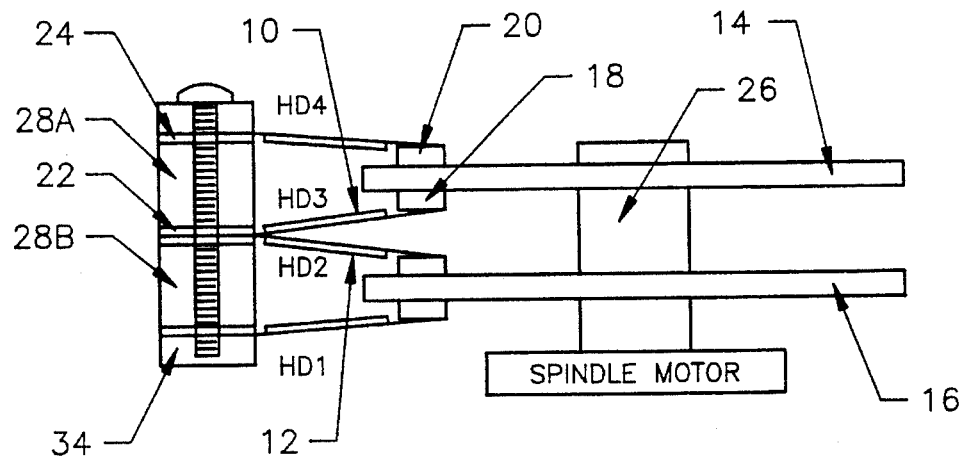
FIG. 5 is a cross-sectional side view representation of the HDA of FIG. 4B using separate support blocks, and showing a motor spindle for rotating the disks during operation.

FIG. 5 shows a side view of the blocks 28A and 28B and head suspensions HD1, HD2, HD3, HD4, rotated and loaded to the disks. To disassemble the head suspensions from the disk drive for replacement of defective heads or suspensions, a reverse sequence of the assembly steps is followed. Rework does not always necessitate disassembly of the entire headstack or E-block.

Figure 6:
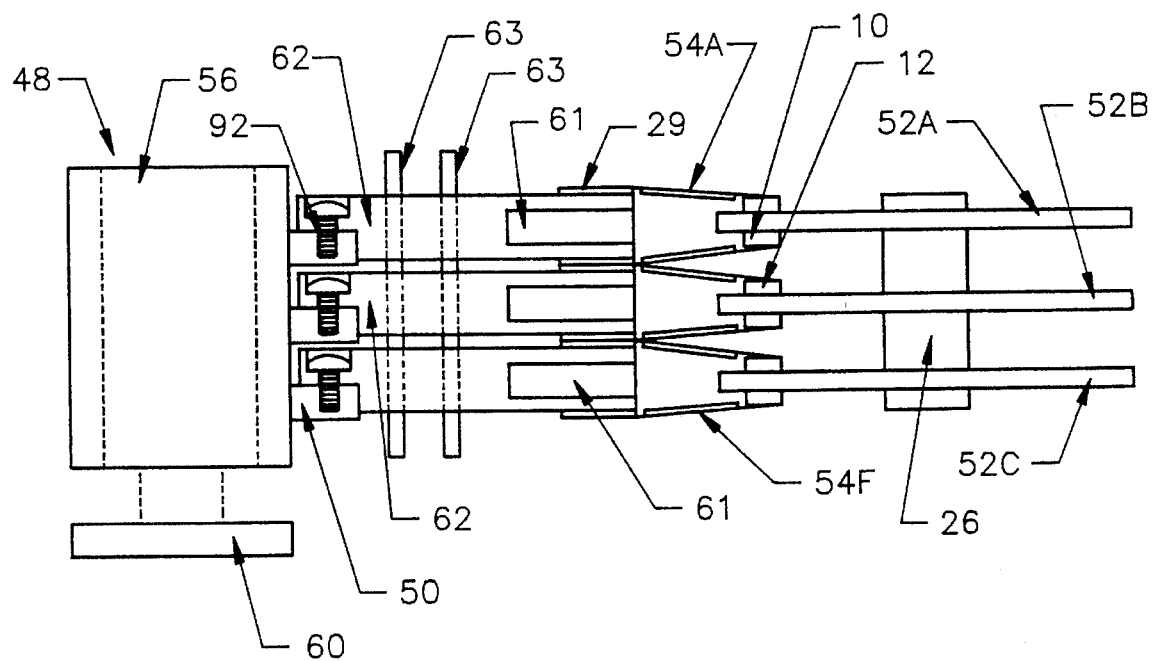
FIG. 6 is a cross-sectional side view of a disk drive with multiple disks and head suspensions, using separate support blocks for the head arms in keeping with this invention.

FIG. 6 depicts a small disk drive in which the head actuator 48 has a separate pivot axis that is displaced from the center of the head arm baseplate 50. The disks 52 A,B,C are located within the spaces between the head suspensions 54 A–F. The center part 56 of the actuator 48 has a centrally located bearing assembly which allows pivoting of the rotatable actuator. The actuator 48 is loaded and secured on an actuator baseplate 60. The preassembled blocks 62 have partial cutouts 61 to avoid interference with the disks. The preassembled blocks 62, each consisting of an UP head 10 and a DOWN head 12, are sequentially moved into place and fastened by screws to the actuator 48. The sliders 18 and 20 of each head suspension are loaded onto the disks, and blocks 62 are aligned by means of alignment pins 63. The blocks 62 are moved into place and the sliders 18 and 20 of each head suspension are loaded onto the disks until all the blocks 62 are in place. This type of assembly is applicable to small disk drives such as those with 1.8, 2.5 or 3.5 inch formats.

Figure 7A:
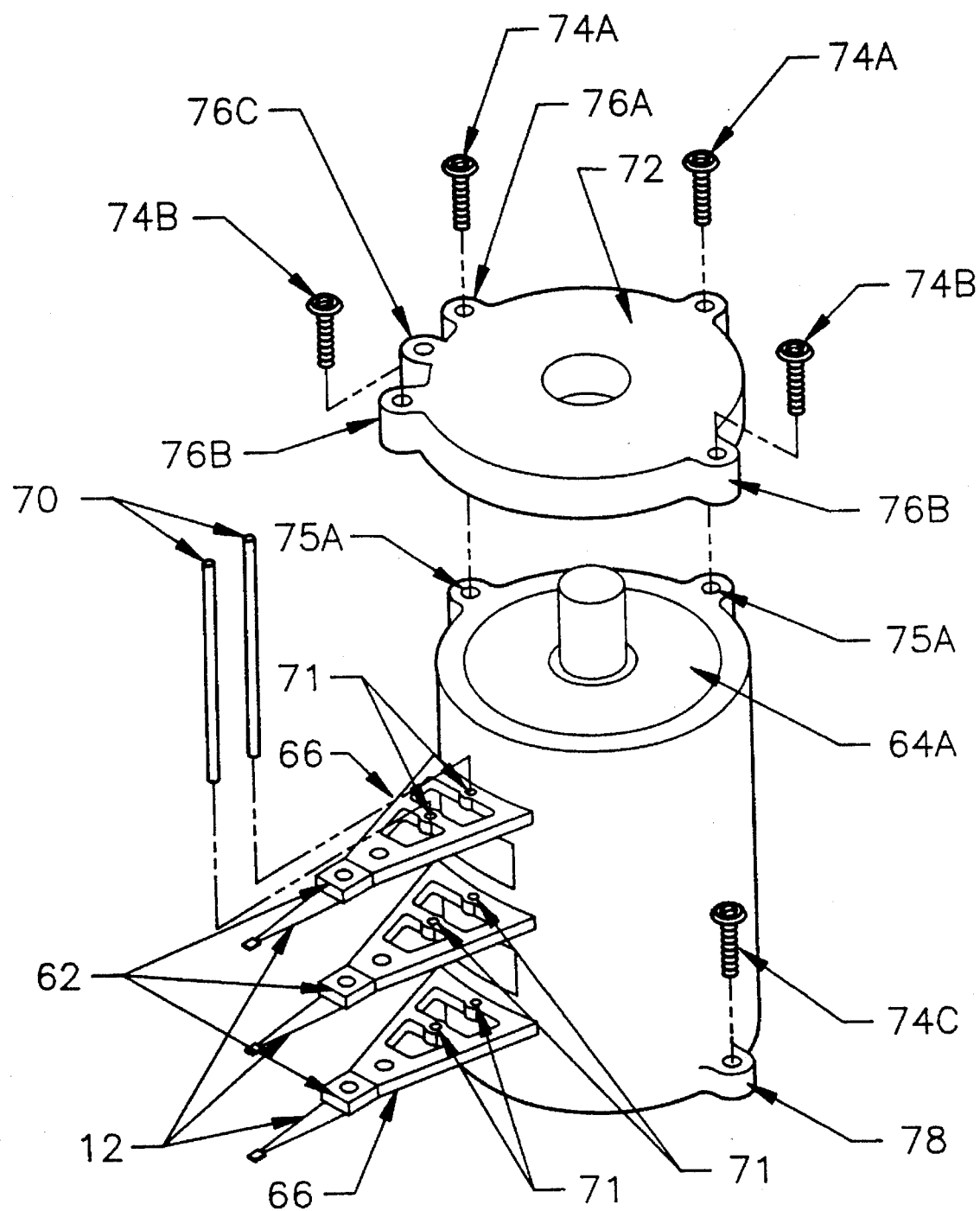
FIGS. 7A is an isometric view, partly exploded, of an alternative design of forming a headstack showing an inner module of a modular design, in accordance with this invention.
Figure 7B:
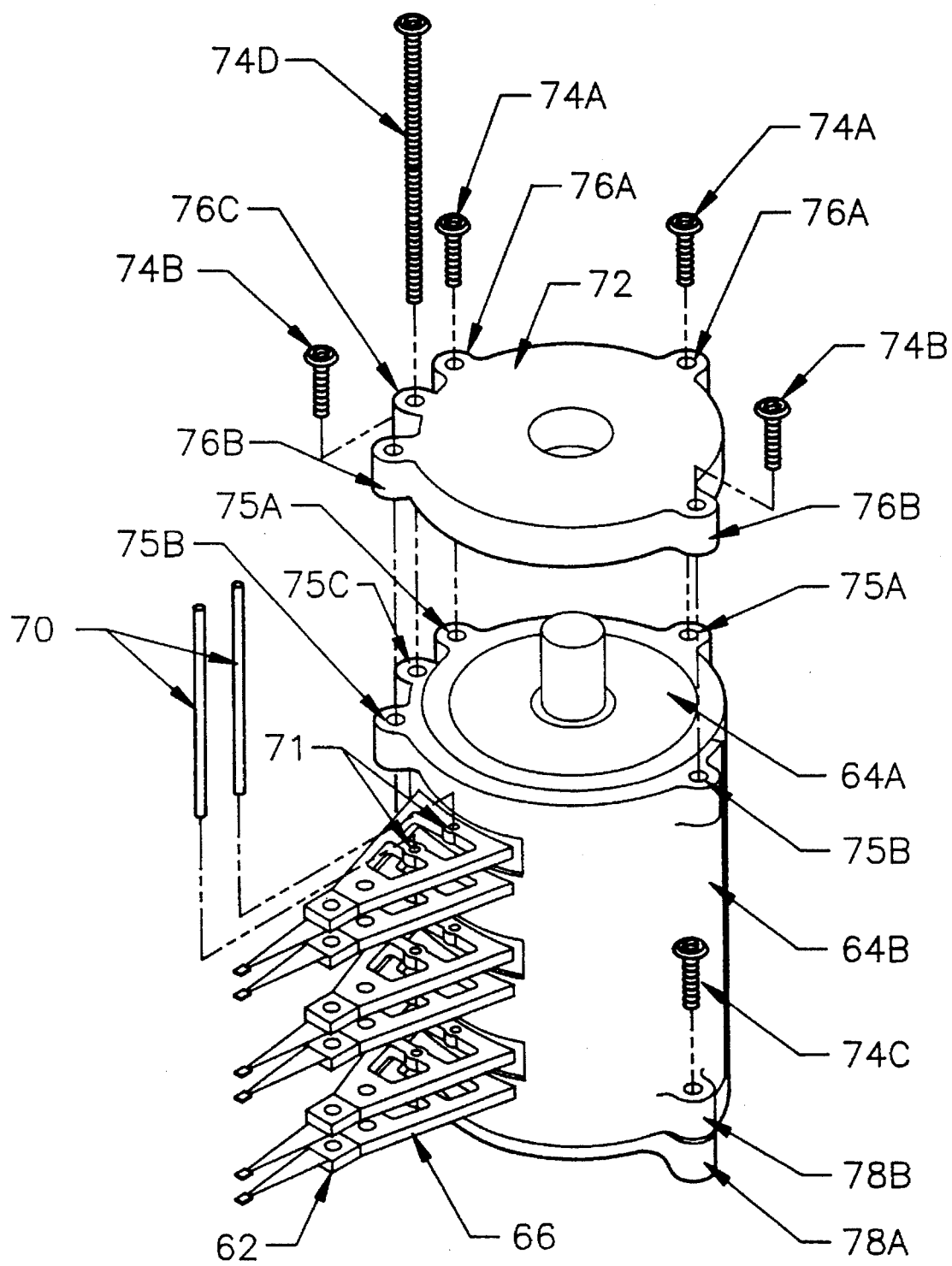
FIGS. 7B and 7C are isometric views, partly exploded, of the modular design, showing the assembly of inner and outer modules.

Another embodiment of a headstack design made in accordance with this invention is illustrated in FIGS. 7A, 7B and 8A. The headstack consists of an inner module 64A and outer module 64B. Each module is formed, by die casting for example, from a solid single piece consisting of the modular body and extending support elements 66. As shown in FIGS. 7A, 7B and 8A, the head suspensions are joined to mount elements 62 that are attached to the support elements 66 which were formed with the die cast modules 64A and 64B. The ends of the support elements 66 are arcuate to match the curved walls of the cylindrical shaped modules 64.

The inner module 64A is assembled with a bearing assembly (not shown) and a voice coil assembly that is attached to the inner module 64A and spaced from the suspensions. Head suspensions are mounted to the support elements 66 either by adhesive or swaging. The inner module 64A supports all DOWN heads, whereas the outer module 64B which is interlocked with the first module 64A supports all UP heads in alignment with the DOWN heads of the module 64A. During operation of the disk drive, the voice coil assembly, which may be a rotary actuator, moves the modular assembly and suspensions in response to command signals, so that the heads are transported radially across the disk surfaces to selected disk cylinders or data tracks, in a well known manner.

Figure 7C:
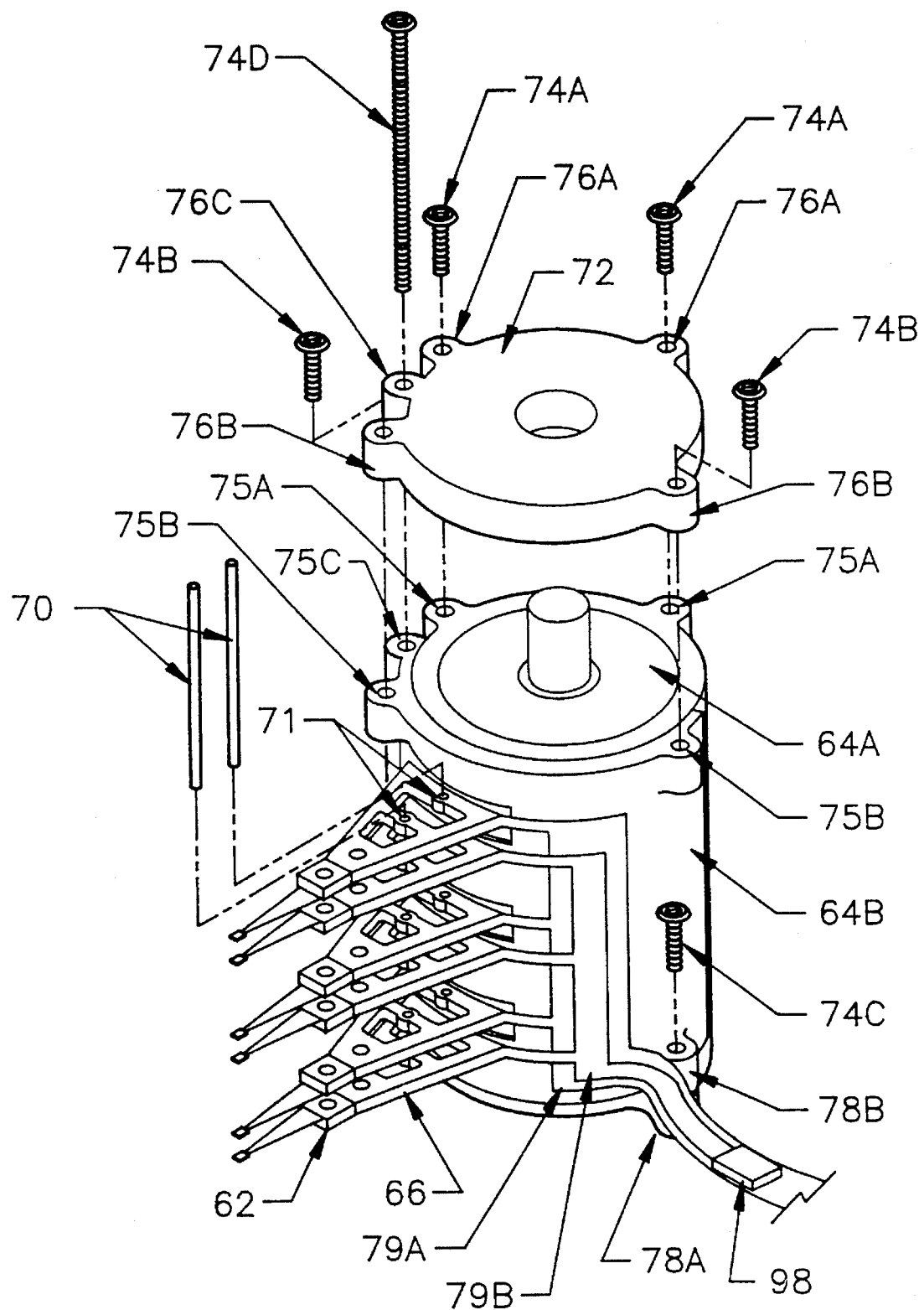

During assembly of the modules, the inner module 64A is first loaded into the disk pack. The outer module 64B is lowered at an offset angle relative to the inner module around the outer peripheral wall of the inner module until the lower end of module 64B is located above the lowest level of threaded tabs 78. The outer module 64B is then rotated so that the suspensions associated with the outer module are moved towards the disks. The rotation of the module 64B is ended when all of the DOWN heads and all of the UP heads of the two modules 64A and 64B are aligned in an alternating arrangement. A final alignment is achieved by inserting alignment pins 70 through alignment holes 71. Screws 74C are inserted through the apertured tabs 78B of the outer module, only one of the tabs 78B being illustrated in FIGS. 7B and 7C. The screws 74C are fastened into the threaded tabs 78A of the inner module by means of a fastening tool that is adapted to pass through apertures in the tabs 76B and 75B. The screws 74A and 74B pass through apertured tabs 76A and 76B on the cover 72 and engage tabs 75A and 75B. Next the screw 74D is inserted through apertured tab 76C on the cover, through apertured tabs 75C on the outer module, and fastened into the threaded tab 78A on the base of the inner module. The locking screws 74A, 74B, 74C cause the outer module 64B to be pressed tightly against the inner module 64A thereby forming a rigid assembled modular body. Each module 64A and 64B has its own flexible cable 79A, 79B respectively joined to the circuit wiring of the head assemblies. The cables are joined together by a connector 98. Damping materials are sandwiched in gaps 85 (see FIG. 9) between the outer and inner modules to minimize resonance. The head comb is then released to load the outer module heads onto the disks and the alignment pins 70 are removed. As illustrated in FIG. 8A, slots 68 are provided in the outer module 64B that pass over the associated arms of the inner module 64a so as to avoid mechanical interference during assembly. To disassemble the modules, a reverse sequence of the assembly procedure is followed. Rework may involve the outer module only and thus would not require the disassembly of the entire headstack from the disk drive. The implementation of FIG. 7B is applicable to 3.5 inch or larger disk drives.

FIG. 8B illustrates a comb-like tool 86 that serves as a block to space the head suspensions during assembly and alignment of the headstack. The tool 86 has protruding spacer bars 88 that are located between adjacent head suspensions for the loading procedure. The inner module is first loaded and locked to the tool 86. Holding pins 87 are inserted through holes 93 in the top plate 89 of head comb tool 86 and through alignment holes 71 of the head arms of the modules, and through constrictions in holes 95 of the baseplate 91 of the head comb to lock the arms in place. The inner module is positioned and oriented to seat the DOWN head sliders to respective disk surfaces. After loading the inner module to the disks, the tool is released from the inner module. The loading of the outer module is then lowered around the inner module and locked to the tool 86 to implement the loading of the UP head sliders to respective disk surfaces.

FIG. 9 shows a modification of the head assembly wherein the head arms 82 on the inner module 64A are made thicker to improve stiffness. On the other hand, the head arms 84 on the outer module 64B are made thinner to reduce weight and yet provide sufficient mechanical rigidity for the head suspensions during assembly, handling and storage. Damping material may be sandwiched between the head arms 82 and 84 to reduce vibration of the arms. With this design, the headstack modules can be initially positioned in an interleaved arrangement and oriented to allow an interlocking screw 80 to be fastened separately to each pair of adjacent head arms 82 and 84 that support the DOWN heads and UP heads respectively. The screws 80 do not interfere with the data disks. In the arrangement disclosed herein, each screw 80 is formed with a throughhole 92 to allow access by a fastening tool to any one of the screws that are vertically aligned. Each screw 80 can be independently unfastened by the fastening tool which has an extendible lip for engaging the screw slot.

Figure 11:
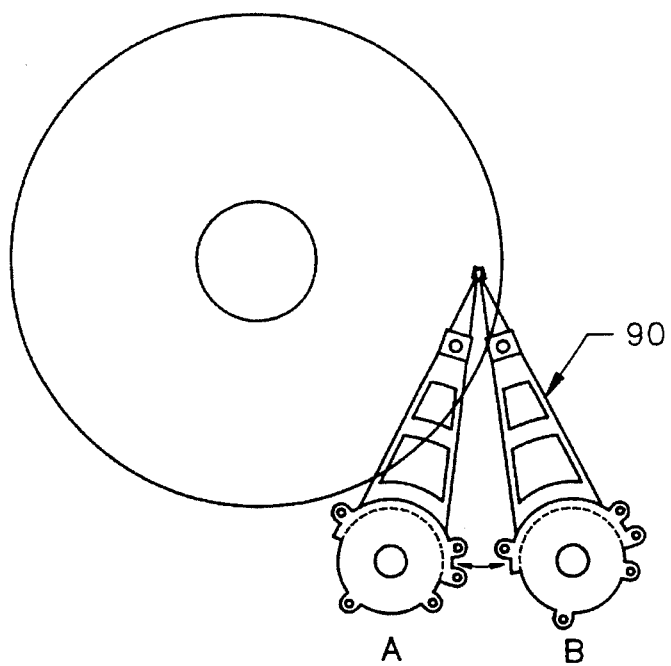
FIG. 11 is a top plan representational view illustrating the positions of a suspension relative to a disk during the loading process.

FIG. 11 shows a suspension 90 located in an intermediate position B where more of the actuator arm area is exposed for module-to-module alignment and attachment. After all of the sliders are loaded, the headstack is moved from its intermediate position B along a reference plane related to the base of the modules until it reaches position A where the modules are locked into the final position. The sliders are then loaded into contact with the disk surfaces. The head comb or the E block is then released.

Figure 10:
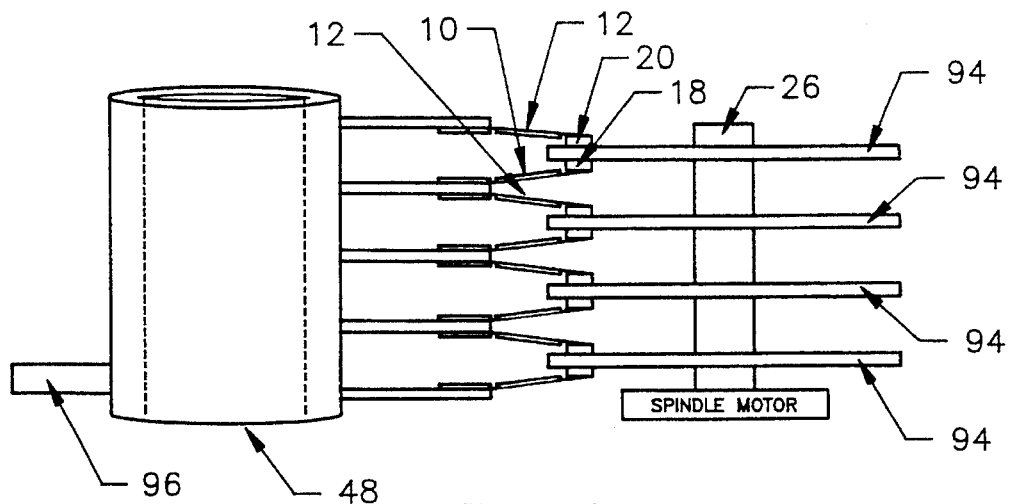
FIG. 10 is a cross-sectional view representation of a conventional HDA and headstack.

FIG. 10 shows an assembled conventional headstack and associated magnetic disks 94 with the headstack assembly connected to a voice coil motor 96.

Figure 13A:
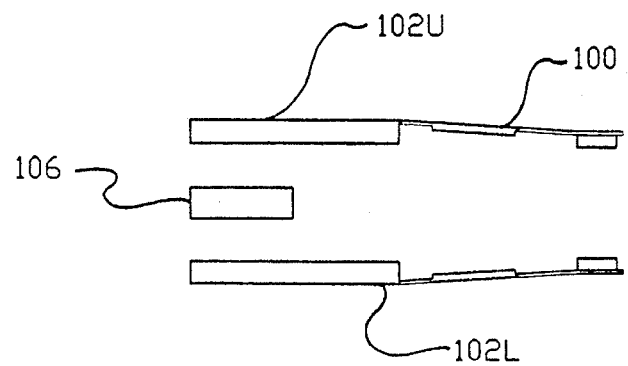
FIGS. 13A–C illustrate a head arm/disk assembly which incorporates spacers between the head suspension mounting elements.
Figure 13B:
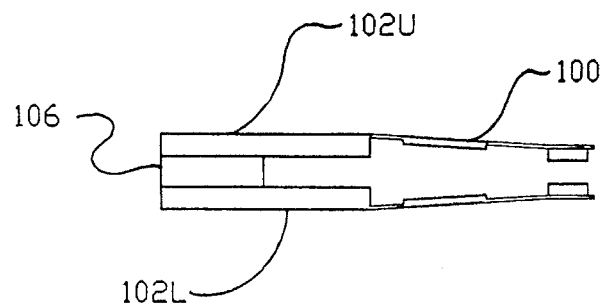
Figure 13C:
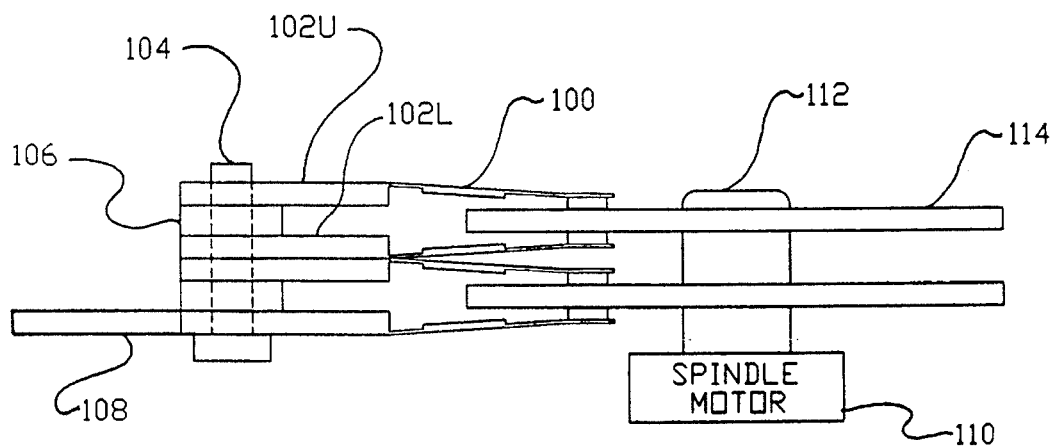

With reference to FIGS. 13A–C, a head arm/disk assembly includes a head arm 100 having a mounting element 102U. The head arm 100 is associated with the top of the magnetic disk 114 which is mounted to a hub 112 that is driven by a spindle motor 110. A head arm that is attached to a lower mounting element 102L is associated with the bottom surface of the magnetic disk 114. The mounting elements 102U and 102L are seated on a rotary actuator means 104 with a spacer 106 between the mounting elements. The mounting elements 102U, 102L and the spacer 106 are aligned and joined together, by adhesive for example. In FIG. 13C, the disk drive apparatus includes two disks and four head arms which are attached to four mounting elements respectively. The headstack assembly includes a voice coil actuator 108.

Figure 14:
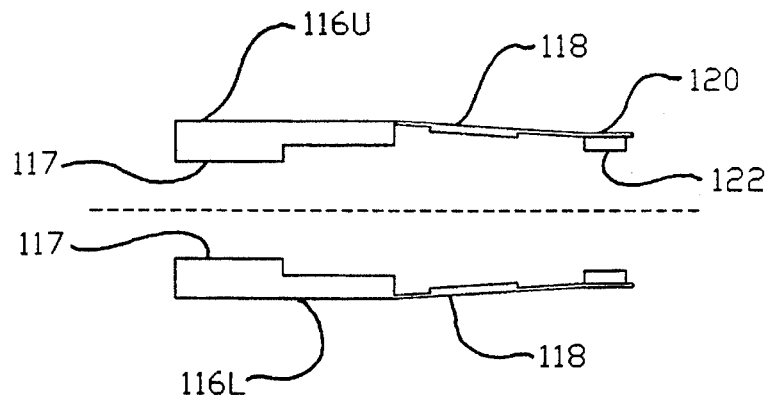
FIG. 14 is a side view of separated head arms showing a shoulder configuration for the mounting element of the head arm.
Figure 15:
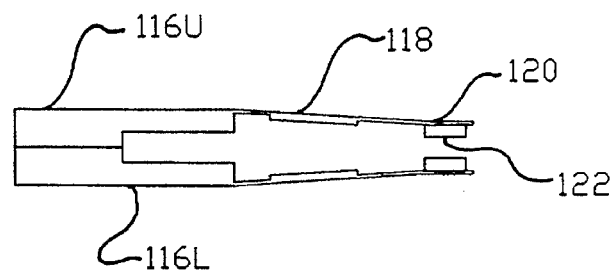
FIG. 15 is a side view showing the head arm of FIG. 14 with the mounting sections aligned prior to final assembly.
Figure 16:
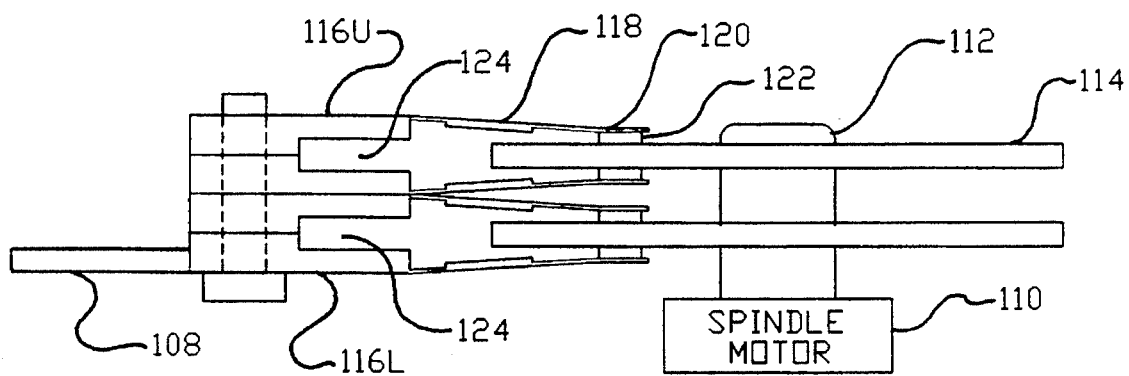
FIG. 16 is a side view of the head arm/disk assembly incorporating the inventive concept.

In FIG. 14, two head arms 118 are depicted having separated mounting elements 116U and 116L. Head suspension 120 and DOWN slider 122 are attached to the upper head arm 118, and a similar suspension with an UP slider are attached to the lower head arm 118. The mounting elements 116U an 116L each have a shoulder projection or step 117 which are aligned and joined by adhesive for example to adjacent shoulder projections during assembly of the disk drive, as shown in FIG. 15. The final assembly shown in FIG. 16 includes the two disks and associated head arms with the mounting elements 116U and 116L joined without spacers such as were used in the prior art disk apparatus shown in FIG. 13. In this way, the Z-height of the disk drive is reduced. Also, the slots 124 between the mounting elements allow larger disks to be used, thereby enabling increased storage capacity.

By virtue of this invention, it is possible to assemble more disks and head assemblies in the same physical space used for conventional head loading in a disk drive. With the inventive design, the same vertical space (Z height) that was used for loading one suspension, for example the UP head suspension, is shared by its complementary DOWN head suspension, thereby resulting in overall smaller disk-to-disk spacing in the assembled headstack. During the assembly process, the UP and DOWN head suspensions can be swaged in the same direction thereby achieving uniformity and avoidance of variations in gram loading of the heads to the disks. The suspensions on a module do not need to be combed back for shipping or storage thereby minimizing variations in the gram load. Also the independent support structures, i.e., the blocks and the modules, allow facile disassembly for replacement of defective heads without impacting the other head suspensions.

What is claimed is:

1. A disk drive apparatus comprising:
   a plurality of disks disposed in a vertical space and having data storage tracks that rotate about a central axis;
   a motor spindle for rotating said disks;
   a multiplicity of magnetic head assemblies including suspensions for carrying head sliders and magnetic transducers;
   a rotary actuator for bidirectionally transporting said head assemblies across said data tracks;
   a headstack assembly including a first support structure for supporting a first number of said suspensions which carry only UP head sliders and a second support structure supporting a second number of said suspensions which carry only DOWN head sliders, said first number and said second number of said suspensions being the total number of said suspensions in said headstack assembly;
   means coupling said headstack assembly to said actuator for rotating one of said first and second support structures independently of the other for loading and unloading said UP and DOWN sliders separately;
   whereby said vertical space between said disks is effectively minimized by the sharing of said space by said suspensions supporting said UP sliders with said suspensions supporting said DOWN sliders.

2. A disk drive apparatus as in claim 1, including a bearing assembly joined to said support structures for allowing rotation of said structures.

3. A disk drive apparatus as in claim 1, wherein said first and second support structures comprise first and second cylindrical modules respectively.

4. A disk drive apparatus as in claim 3, including a first flexible circuit cable coupled to the head assemblies of said first module and a second flexible circuit cable coupled to the head assemblies of said second module, and an electrical connector for connecting said cables to external circuitry.

5. A disk drive apparatus as in claim 3, including damping material disposed between said modules for minimizing vibration.

6. A disk drive apparatus as in claim 3, wherein said modules are formed as integral single pieces for interlocking with each other.

7. A disk drive apparatus as in claim 3, wherein said modules are integral die cast bodies.

8. A disk drive apparatus as in claim 3, including a cover for capping said modules.

9. A disk drive apparatus as in claim 8, wherein said cover and said modules include apertured tabs for alignment and joining, by screws inserted through said apertured tabs, said cover and modules in a tight close fit.

10. A method of assembling a headstack in a rotary actuator disk drive, said disk drive having at least two disks disposed about a central axis, said headstack including a multiplicity of head suspensions, a first number of said suspensions being UP slider suspension that carry only UP air bearing head sliders and a second number of said suspensions being DOWN slider suspension that carry only DOWN air bearing head sliders, including a rotatable outer module for supporting all of said UP slider suspensions and for rotating said UP slider suspensions about said central axis, and an inner module for supporting all of said DOWN slider suspensions comprising the steps of:
   mounting said suspensions with said attached UP and DOWN sliders respectively to said outer and inner modules;
   rotating said outer module and said UP slider suspensions relative to said central axis;
   aligning said modules and said suspensions parallel to said central axis of said disks;
   individually loading the head sliders of one of said modules to said disks while maintaining unloaded the head sliders of the other of said modules away from said disks;
   then individually loading the head sliders of the other of said modules so that all of said head sliders are loaded to the disks.

11. A method as in claim 10, including the step of swaging all of said suspensions in the same direction.

* * * * *